US009869855B2

(12) United States Patent
Slack et al.

(10) Patent No.: US 9,869,855 B2
(45) Date of Patent: Jan. 16, 2018

(54) PICTURE ELEMENT DRIVEN BY TWO SETS OF GRAYSCALE VALUES, ONE SET BEING LESS THAN THE OTHER

(71) Applicant: Liquavista B.V., Eindhoven (NL)

(72) Inventors: Anthony John Slack, Lorgues (FR); Bokke Johannes Feenstra, Nuenen (NL)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 14/244,224

(22) Filed: Apr. 3, 2014

(65) Prior Publication Data

US 2014/0210809 A1    Jul. 31, 2014

Related U.S. Application Data

(63) Continuation of application No. PCT/EP2012/069694, filed on Oct. 5, 2012.

(30) Foreign Application Priority Data

Oct. 6, 2011   (GB) .................................. 1117268.1

(51) Int. Cl.
  *G02B 26/00*   (2006.01)
  *G09G 3/34*    (2006.01)
  *G09G 3/20*    (2006.01)

(52) U.S. Cl.
  CPC .......... *G02B 26/005* (2013.01); *G09G 3/348* (2013.01); *G09G 3/3446* (2013.01); *G09G 3/2011* (2013.01); *G09G 3/2014* (2013.01)

(58) Field of Classification Search
  CPC ...... G02F 1/167; G09G 3/2011; G09G 3/344; G09G 3/348; G02B 26/005
  See application file for complete search history.

(56) References Cited

U.S. PATENT DOCUMENTS

| 2005/0052346 | A1  | 3/2005 | Koyama |
| 2005/0185003 | A1* | 8/2005 | Dedene et al. ............... 345/694 |
| 2007/0019006 | A1* | 1/2007 | Marcu .................. G02B 26/005 345/690 |

(Continued)

FOREIGN PATENT DOCUMENTS

| WO | 03071346 A1    | 8/2003 |
| WO | 2006017129 A2  | 2/2006 |
| WO | 2011015669 A1  | 2/2011 |

OTHER PUBLICATIONS

K.M.H. Lenssen et al., "Novel concept for full-color electronic paper," Journal of the SID 17/4, 383 (2009).

(Continued)

*Primary Examiner* — Sepehr Azari
(74) *Attorney, Agent, or Firm* — EIP US LLP

(57) ABSTRACT

An electrowetting display device includes a control system for changing a configuration of first, second and third fluids by applying a voltage level of a first voltage to a first electrode and by applying a voltage level of a second voltage to a second electrode. The voltage level of the first voltage is selected from a first plurality of voltage levels and the voltage level of the second voltage is selected from a second plurality of voltage levels, the second plurality of voltage levels comprising fewer voltage levels than the first plurality of voltage levels.

27 Claims, 12 Drawing Sheets

(56) References Cited

U.S. PATENT DOCUMENTS

| | | |
|---|---|---|
| 2007/0273295 A1* | 11/2007 | Wakabayashi et al. ... 315/169.3 |
| 2008/0088647 A1 | 4/2008 | Marcu et al. |
| 2009/0135317 A1 | 5/2009 | Lynam et al. |
| 2009/0169806 A1 | 7/2009 | Lo et al. |
| 2009/0195568 A1* | 8/2009 | Sjodin .......................... 345/690 |
| 2010/0045649 A1 | 2/2010 | Boom et al. |
| 2010/0060628 A1 | 3/2010 | Lenssen et al. |
| 2010/0128015 A1 | 5/2010 | Feenstra et al. |
| 2010/0296149 A1* | 11/2010 | Feenstra ............. G02B 26/005 359/290 |
| 2011/0140996 A1 | 6/2011 | Parry-Jones |

OTHER PUBLICATIONS

A.R.M. Verschueren et al., "Optical performance of in-plane electrophoretic color e-paper," Journal of the SID 18/1, 1 (2010).

* cited by examiner

PICTURE ELEMENT DRIVEN BY TWO SETS OF GRAYSCALE VALUES, ONE SET BEING LESS THAN THE OTHER

CROSS REFERENCE TO RELATED APPLICATIONS

This application is a continuation under 35 U.S.C. § 120 of PCT Application No. PCT/EP2012/069694 filed Oct. 5, 2012.

BACKGROUND

Examples of known electrowetting display devices include single layer displays comprising one oil layer and two layer displays including two oil layers separated from each other by water. In these examples, the oil layers may be coloured and switched independently to change a display effect of the device, for example a colour or a grey scale.

Electrowetting devices including single oil layer displays and multi layer displays, for example with opposing portions of liquid which may be advanced or retreated over an aperture to change a display effect, are also known.

A disadvantage of such systems is that to change the configuration of the oil layer(s), a high operating power is required. Moreover, such systems require complex electronics for addressing both oil layers.

It is desirable to provide an improved electrowetting display device.

DETAILED DESCRIPTION

Figure 1:
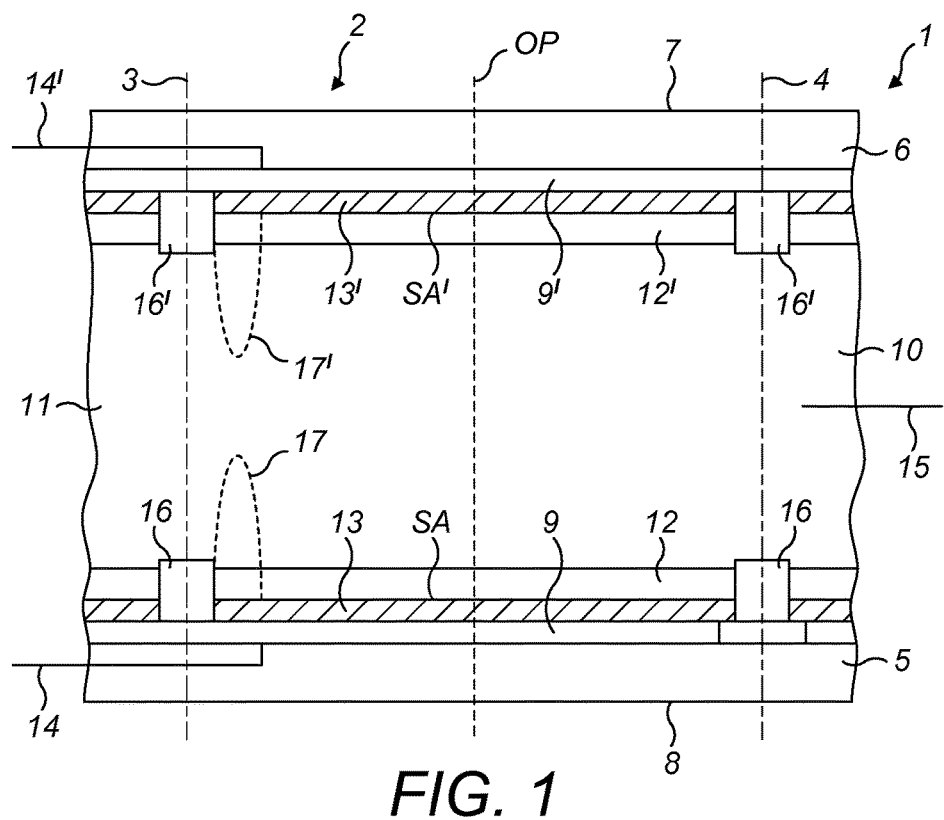
FIG. 1 shows schematically a picture element according to an embodiment.

The entire contents of the following patent documents are incorporated by reference herein:
1. GB 1117268.1 filed Oct. 6, 2011
2. PCT/EP2012/069694 filed Oct. 5, 2012

Embodiments described herein relate to a display device, for example an electrowetting display device.

Before describing detailed embodiments referencing the Figures, embodiments will be described in summary form.

In accordance with first embodiments, there is provided an electrowetting display device including a picture element, the picture element comprising: a space; a first surface facing the space; a second surface facing the space and the first surface; a first fluid, a second fluid and a third fluid, the first fluid and the third fluid being arranged on at least part of the first surface and the second surface, respectively, and the second fluid being immiscible with the first fluid and the third fluid, the first, second and third fluids being within the space; and a first electrode associated with the first surface and a second electrode associated with the second surface, the electrowetting display device comprising a control system for changing a configuration of the first, second and third fluids by applying a voltage level of a first voltage to the first electrode and by applying a voltage level of a second voltage to the second electrode, wherein the control system is arranged such that the voltage level of the first voltage is selected from a first plurality of voltage levels and the voltage level of the second voltage is selected from a second plurality of voltage levels, the second plurality of voltage levels comprising fewer voltage levels than the first plurality of voltage levels.

The inventors have surprisingly realised that with the first plurality of voltage levels being different from the second plurality of voltage levels, with the second plurality comprising fewer voltage levels than the first plurality, no voltage may be applied to the second electrode for many (for example at least 50%) of the display effects the picture element may be switched to, thus eliminating any power consumption for switching the third fluid for those display effects. Such display effects, not requiring a voltage to be applied to the second electrode also reduce electromagnetic influence and interference of the picture element on its surroundings. Secondly, despite the second plurality comprising fewer voltage levels, the display device can be configured to provide an equivalent number of grey scale display effects as a known display device using only a single oil layer.

From known display devices, one would expect a maximum number of available voltage levels to be provided for each oil layer, to maximise the number of possible grey scale levels and thus the display capabilities, so the driving of the first fluid and the driving of the second fluid can be controlled identically, with the same number of available voltage levels. Accordingly, it is surprising that, in embodiments, setting the first plurality with a greater number of voltage levels than the second plurality can give an equal number of grey scale display states, contrast levels and resolution, while requiring lower power consumption compared with a single oil layer display. In this way, the combination of the first fluid configuration and the third fluid configuration gives a desired display effect, such as a grey scale level. Thus, the number of voltage levels required for each of the first and the third fluids is less than the number of voltage levels required for driving a single oil layer of a known display device. Thus, the power consumption for driving both the first and the third fluids may be less than a known display device.

In an embodiment, a thickness of the first fluid substantially equals a thickness of the third fluid. In other embodiments, the thickness of the first liquid is different from the thickness of the third fluid. The thickness is defined along an optical path OP illustrated in FIG. 1, for example. The term substantially used herein means that the thickness of the first fluid and the third fluid are equal, within manufacturing tolerances.

The thickness of the first and/or third fluid determines the voltage required to change the fluid configuration. In examples described further below where the combination of the first and third fluid is arranged to absorb all wavelengths of light in the visible spectrum, the thickness of the first and third fluids may each be half the thickness of the oil layer of a single oil layer display of a known display device.

Although the first and third fluids are half as thick, in combination they provide an equivalent light absorption as the single oil layer in a known display device. Moreover, the thinner first and third fluids require lower driving voltages in total, compared with the voltages required to drive a single oil layer display of a known display device with an oil thickness equal to the combined thickness of the first and third fluids. Thus, embodiments provide further reduced power consumption, whilst being capable of providing the same number of grey scale levels as known single-layer systems. Moreover, compared with known systems, embodiments provide a more intelligent and versatile way of applying voltages to the first and third fluids, thus giving a lower power consumption, as well as a reduced complexity of the electronics and interconnections. The driving voltages for the first and third fluids may be tuned by determining the thickness of the first and third fluids, depending on the desired application for the display. For example, the first fluid thickness may be ⅓ and the third fluid thickness may be ⅔ of the combined thickness of the first and third fluids.

In some embodiments the first fluid and the third fluid are arranged to absorb light of at least one wavelength, for example to act as a colour filter. In some embodiments the first fluid and the third fluid may be arranged to absorb all wavelengths in the visible spectrum; thus, the first and third fluid can act as a light valve by being switched into and out of the path of light passing through the picture element. In certain embodiments, the sum of the thickness of the first fluid and the thickness of the third fluid equals a fluid thickness required for the picture element to provide a black display state (for providing a black display effect). Thus, as explained above, the thickness of the first fluid and the thickness of the third fluid may each for example be half of the thickness of a single oil layer of a known display device, and therefore capable in combination of providing a black display effect equivalent to that in a known display device.

In some embodiments the control system comprises a first driver type arranged to apply said first voltage to the first electrode and a second driver type arranged to apply said second voltage to the second electrode. With the second plurality comprising fewer voltage levels than the first plurality, the demands of the electronics system for driving the third fluid may be less than for driving the first fluid. For example, a simpler driver integrated circuit (IC) may be used for the third fluid, which may be cheaper to purchase, reducing the overall cost of the final display. Moreover, using simpler driver ICs may require less processing during manufacture, thus simplifying the manufacturing process. Such a simpler IC may for example be a pulse width modulated (PWM) driver which typically is also smaller and more readily available at higher voltage capability than analogue drivers at the same driving voltage.

In one example, said first plurality of voltage levels comprises 32 different voltage levels (5 bit) and said second plurality of voltage levels comprises 2 different voltage levels (1 bit). Thus, a 6 bit display may be provided, with 64 different available grey scale levels, but without requiring the high voltages compared with known systems for switching a single oil layer and without requiring a 6 bit driver IC and configuring a driver control system accordingly. For the second plurality of voltage levels, one of the two voltage levels may be an off level where no voltage is applied, and the other voltage level may be an on level where a voltage is applied for setting a configuration of the third fluid to allow a suitable amount of light to pass through the picture element without incurring the third fluid.

In another example, the first plurality of voltage levels comprises 21 different voltage levels and said second plurality of voltage levels comprises 3 different voltage levels. Thus, the demands on the driver IC for the first fluid and the uniformity of the first fluid thickness are notably less than for a driver IC required for handling 32 voltage levels. Clearly, also, in this example, requirements for the third fluid in terms of oil film thickness uniformity and grey scale capability may be much less than for a known display.

In an embodiment, the first driver type is an analogue driver and the second driver type is a pulse width modulated driver. For the examples given above, an analogue driver may be a 5 bit (32 voltage levels) or a 3-4 bit driver (21 voltage levels), and the pulse width modulated driver may be a 1 bit driver (2 or 3 voltage levels, depending if an intermediate common voltage level is used as well as two extreme voltage levels). Analogue drivers are expensive compared with pulse width modulated drivers; thus by embodiments allowing a smaller pulse width modulated driver that is more readily available at higher voltage capability to be used for driving the third fluid, the costs of the display components can be reduced.

It is known that, for realising a grey scale level of an electrowetting display, a configuration of a single oil layer may be controlled by modulating a voltage amplitude (analogue driving), a voltage duration (pulse width modulation driving), and/or a combination of both voltage amplitude and duration (so-called semi-analogue driving); moreover, in the case of semi-analogue driving, a single IC is used to address a single pixel. However, this is different from the embodiments using an analogue driver for driving the first fluid and a different driver type, namely a pulse width modulated driver, for driving the second fluid.

The simplicity of the driving of the third fluid facilitates integration of the driving electronics into the device. Therefore, in some embodiments, the second driver type may be integrated within electronics of the substrate supporting the second surface. This may be achieved using amorphous silicon (a-Si) or low temperature polysilicon (LTPS) for the electronics.

In some embodiments, a different driver type may be used to drive the first and third fluids, which may affect a design of the display device and the manufacturing process. For example, where a pulse width modulated driver may be used to drive the third fluid, this driver and its associated circuitry may be integrated with the substrate material, for example glass, rather than needing to provide a separate IC on the substrate, which is more bulky and thus increases the overall size of the display device.

In some embodiments, the control system is arranged to configure the picture element with a predetermined display effect by applying a selected one of the first plurality of first voltage levels to the first electrode and a selected one of the second plurality of second voltage levels to the second electrode. Thus, the combination of the configuration of the first and the third fluid corresponding with the selected voltage levels gives a desired display effect. The control system may for example use a look-up table to identify a voltage level to apply to the first and second electrodes, to provide the desired display effect.

In some embodiments, the electrowetting display device comprises a third electrode arranged so the first voltage is applied between the first electrode and the second fluid, and so the second voltage is applied between the third electrode and the second fluid. Thus, the third electrode may be a common electrode for the picture element, for instance in the case where the third electrode contacts the second fluid.

In accordance with second embodiments, there is provided a display device including a picture element for changing a characteristic of radiation passing through the picture element, the picture element comprising: a first electrode and a second electrode; and a first display element and a second display element configurable for changing said characteristic, the display device comprising a control system for changing said characteristic by applying a voltage level of a first voltage to the first electrode and a voltage level of a second voltage to the second electrode, to determine a configuration of at least one of the first and second display elements, wherein the control system is arranged such that the voltage level of the first voltage is selected from a first plurality of voltage levels and the voltage level of the second voltage is selected from a second plurality of voltage levels, the second plurality of voltage levels comprising fewer voltage levels than the first plurality of voltage levels.

As explained above for the first embodiments, with the second plurality of voltage levels comprising fewer voltage levels than the first plurality of voltage levels, the display may for example consume less power.

Features of the first embodiments are not limited to electrowetting devices. Indeed, using a second plurality of voltage levels comprising fewer voltage levels than the first plurality of voltage levels, to change a characteristic of radiation such as the colour of visible light, may be applied to any display device which for example uses two switchable display elements to change a radiation characteristic.

As an example of a display device incorporating the second embodiments, the picture element comprises a first support plate and a second support plate facing the first support plate, the first electrode being associated with part of the first surface and the second electrode being associated with part of the second surface, the first electrode being arranged to change the configuration of the first display element in dependence on the first voltage, and the second electrode being arranged to change the configuration of the second display element in dependence on the second voltage, thereby determining a display effect of the picture element. The second electrode may further be arranged to change the configuration of the first display element, in dependence on the second voltage. Further, or alternatively, the first electrode may be arranged to change the configuration of the second display element, in dependence on the first voltage.

As another example of a display device incorporating the second embodiments, the first display element may comprise a first plurality of particles and the second display element may comprise a second plurality of particles each being selected to provide a predetermined optical property and having a predetermined charge. The predetermined optical property may be absorption, reflection or scattering of at least one predetermined wavelength.

Further, in some second embodiments, the first plurality of particles and/or the second plurality of particles may be suspended in a fluid, which facilitates smooth changing of the particle configurations. The first and second plurality of particles may be arranged such that the first plurality of particles moves at a different speed through the fluid than the second plurality of particles.

In such embodiments where a display element comprises a plurality of particles, the display device may be an electrophoretic display device. This may be bistable, which can allow a passive matrix type, full colour, low power, display device to be provided.

According to further embodiments, there is provided a control system according to the control system described herein in accordance with the embodiments. Such a control system may be sold separately and later incorporated in a display device during its manufacture. Buying the control system separately allows the display device to be manufactured simply and cost effectively.

FIG. 1 shows a diagrammatic cross-section of an embodiment of an electrowetting display device 1. Some features described below are similar to other features described below; such similar features will be referred to using the same reference numeral, marked with a prime character, i.e. '; corresponding descriptions for such features should be taken to apply also.

The display device includes a plurality of electrowetting picture elements 2, one of which is shown in the Figure. The lateral extent of the element is indicated in the Figure by the two dashed lines 3, 4. The electrowetting element comprises a first support plate 5 and a second support plate 6. The support plates may be separate parts of each electrowetting element, or the support plates may be shared in common by the plurality of electrowetting elements. The support plates may be made for instance of glass or polymer and may be rigid or flexible.

The display device has a viewing side 7 on which an image formed by the display device can be viewed and a rear side 8. In an alternative embodiment the display may be viewed from the rear side 8. The display device may be of the reflective, transmissive or transflective type. In a reflective display, the first support plate 5 comprises a reflective surface facing the viewing side and the second support plate 6 facing the rear side. In a transmissive display, for example that illustrated in FIG. 1, light passes through the picture element from the rear side to the viewing side along an optical path OP. The display may be a segmented display type in which the image is built up of segments. The segments can be switched simultaneously or separately. Each segment includes one electrowetting element 2 or a number of electrowetting elements 2 that may be neighbouring or distant. The electrowetting elements included in one segment are switched simultaneously. The display device may also be an active matrix driven display type or a passive matrix driven display.

A space 10 between the support plates is filled with three fluids: a first fluid 12, a second fluid 11 and a third fluid 12'. The first fluid may be otherwise referred to as a first display element and the third fluid may otherwise be referred to as a second display element. The second fluid is immiscible with the first fluid and the third fluid. The second fluid is electrically conductive or polar, and may be water or a salt solution such as a solution of potassium chloride in a mixture of water and ethyl alcohol. The second fluid may be transparent, or may be coloured, white, absorbing or reflecting. The first and third fluids are electrically non-conductive and may for instance be an alkane like hexadecane or (silicone) oil. A hydrophobic layer 13 is arranged on the first support plate 5, creating a first surface SA facing the space 10. The layer may be an uninterrupted layer extending over a plurality of electrowetting elements 2 or it may be an interrupted layer, each part extending only over one electrowetting element 2, as shown in the Figure. The layer may be for instance an amorphous fluoropolymer layer such as AF1600 or another low surface energy polymer. Additionally, the electrowetting element is constructed with a hydrophobic layer 13' arranged on the second support plate 6 thus creating a second surface SA' facing the space and the first surface, and walls 16' adjacent the second support plate 6.

The first and third fluids are arranged on at least part of the first surface and the second surface, respectively, the first, second and third fluids being within part of the space 10. In further alternative embodiments, electrowetting elements can be positioned on top of each other to provide more than two switchable electrowetting elements in series in the optical path.

The hydrophobic character of the layers 13, 13' causes the first and third fluids 12, 12' to adhere preferentially to the hydrophobic layers 13, 13', respectively, since the first fluid and the third fluid have a higher wettability with respect to the surface of the hydrophobic layers 13, 13' than the second fluid. Wettability relates to the relative affinity of a fluid for the surface of a solid. Wettability increases with increasing affinity, and it can be measured by the contact angle formed between the fluid and the solid and measured internal to the fluid of interest. This increases from relative non-wettability at an angle of more than 90° to complete wettability when the contact angle is 0°, in which case the fluid tends to form a film on the surface of the solid.

Each element 2 includes a first electrode 9 associated with the first surface SA and a second electrode 9' associated with the second surface, the first and second electrodes 9, 9' being arranged on the first and the second support plates 5, 6, respectively. By referring to the first electrode as being associated with the first surface, it is meant that the first electrode is arranged to apply a voltage to the area of the first surface; similarly, the second electrode being associated with the second surface means the second electrode is arranged to apply a voltage to the area of the second surface. The electrodes 9, 9' are separated from the fluids by an insulator, which may be the hydrophobic layer 13, 13'. In general, the electrodes 9, 9' can be of any desired shape or form. The electrodes 9, 9' are supplied with voltage signals by signal lines 14, 14'. A second signal line 15 is connected to a third electrode which is in contact with the conductive second fluid 11 and is common to all elements, when they are fluidically interconnected by and share the second fluid, uninterrupted by walls. In this case, the third electrode is arranged so the first voltage is applied between the first electrode and the second fluid, and so the second voltage is applied between the second electrode and the second fluid, the second fluid being common to all elements. The electrowetting elements 2 are controlled by a voltage V applied between the signal lines 14, 14' and 15, depending on whether the configuration of the first and/or the third fluids is desired to be changed. The electrodes 9, 9' on the support plates 5, 6 each are connected to a display driving system by a matrix of printed wiring on the support plate. This wiring can be applied by various methods, such as sputtering and structuring or printing techniques.

In a display of the segment type, the electrodes 9, 9' may extend over several elements and define an image region of a plurality of electrowetting elements, which will all be switched simultaneously. When a segment covers several electrowetting elements, the signal lines 14, 14' may be common signal lines for these electrowetting elements.

The lateral extent of the first fluid 12 and the third fluid 12' is constrained to one electrowetting element by walls 16, 16' that follow the cross-section of the electrowetting element. In the embodiment shown in FIG. 1 the walls define the extent of the hydrophobic layers 13, 13'. When the hydrophobic layer extends over a plurality of elements, the walls may be arranged on top of the layer. Alternatively, or additionally, the walls may comprise hydrophilic areas for constraining the first fluid. The periphery of the space of the display device is sealed using sealing members. Further details of electrowetting elements of a display are described in international patent publication no. WO 03071346.

The first and third fluid may absorb at least a part of the optical spectrum. The fluids may be transmissive for a part of the optical spectrum, forming a colour filter. For this purpose the fluids may be coloured by addition of pigment particles or dye. Alternatively, the first and third fluids may be black, i.e. absorb substantially all parts of the optical spectrum, or reflecting. The hydrophobic layers may be transparent or reflective. A reflective layer may reflect the entire visible spectrum, making the layer appear white, or part of it, making it have a colour.

When the voltage V applied between the signal lines 14 and/or 14', and 15, is set at a non-zero signal level of sufficient magnitude the element will enter into an active state. Electrostatic forces will move the second fluid 11 towards the electrodes 9 and/or 9', thereby pushing away and displacing the first fluid 12 and/or the third fluid 12' from at least part of the area of the hydrophobic layers 13, 13' towards the walls 16, 16' surrounding the area of the hydrophobic layer. When fully repelled the first and third fluids are in a drop-like form as schematically indicated by a dashed line 17, 17'. This action contracts the first and third fluids to uncover the surfaces of the hydrophobic layers 13, 13' of the electrowetting element. When the voltage across the element is returned to an inactive signal level of zero for sufficient duration, the element will return to an inactive state, where the first and third fluids flow back to cover the hydrophobic layers 13, 13', respectively. In this way the first fluid and third fluid form an electrically controllable optical switch in each electrowetting element. It will be appreciated that the first and the third fluid may be switched independently of each other, for instance by applying a voltage between the signal line 14 and the common signal line 15 for the first fluid, and separately by applying a voltage between the signal line 14' and the common signal line 15 for the third fluid.

The electrowetting element forms a series capacitor. The second fluid 11 and the electrodes 9, 9' form the plates and the first fluid 12 and the third fluid 12' and the hydrophobic layers 13, 13' the dielectric layers. When the element is in the active state, for example with the first and third fluids having the form 17, 17', the capacitance of the element is higher than when the element is in the inactive state, for example with the first and third fluids having the form 12, 12'. Therefore, each of the first fluid and the third fluid acts as its own capacitor that shares a common electrode in the form of the second fluid 11.

Figure 2:
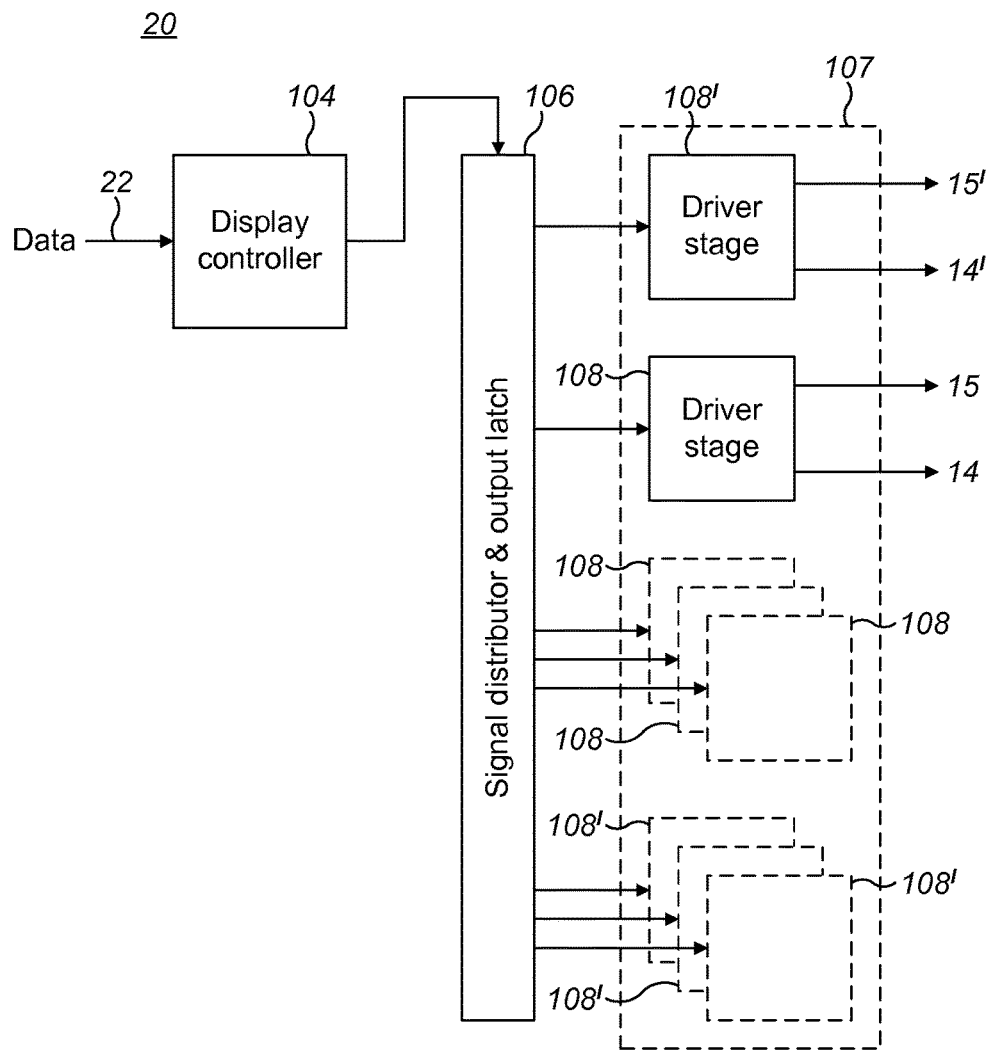
FIG. 2 shows schematically a driving system for an embodiment.

FIG. 2 shows a diagrammatic view of an embodiment of an electrowetting display driving system, including a control system of the display device, according to the embodiments. The display driving system is of the so-called direct drive type and may be in the form of an integrated circuit adhered to the first and second support plates 5 and 6. Alternatively, the display driving system could be located on just one of the first and second support plates. An active matrix type display may also use such a display driving system. The display driving system 20 includes control logic and switching logic, and is connected to the display by means of signal lines 14 and a common signal line 15. Each electrode signal line 14 connects an output from the display driving system 20 to a different first electrode 9, respectively. The common signal line is connected to the second, conductive fluid 11 through an electrode. Also included are one or more input data lines 22, whereby the display driving system can be instructed with data so as to determine which elements should be in an active state and which elements should be in a non-active state at any moment of time.

The embodiment of the controller shown comprises a display controller, 104, e.g. a microcontroller, receiving input data from the input data lines 22 relating to the image to be displayed. The microcontroller, being in this embodiment the control system, is arranged for applying a voltage to the first electrode to provide a first fluid configuration, for example a display state (corresponding with a certain display effect provided on the viewing side), in response to a signal level of the voltage. The microcontroller controls timing and/or a signal level of at least one signal level for a picture element.

The output of the microcontroller is connected to the data input of a signal distributor and data output latch 106. The signal distributor distributes incoming data over a plurality of outputs connected to the display device, which may be via drivers. The signal distributor causes data input indicating that a certain element is to be set in a specific display state to be sent to the output connected to this element. The distributor may be a shift register. The input data is clocked into the shift register and at receipt of a latch pulse the content of the shift register is copied to the output latch. The output latch has one or more outputs, connected to a driver assembly 107. The outputs of the latch are connected to the inputs of one or more driver stages 108 (also referred to below as drivers) within the driving system. The outputs of each driver stage are connected through the signal lines 14, 14' and 15, 15' to a corresponding picture element. In response to the input data a driver stage will output a voltage of the signal level set by the microcontroller to set one of the elements in a corresponding display state.

Thus, the configuration of the first and the second fluid may be controlled by applying a voltage level of a first voltage to the first electrode 9. Similarly, the control system of the display device is arranged to control the configuration of the second fluid and the third fluid, by applying a voltage level of a second voltage to the second electrode, by using similar components as those described above, such as the driver stage, which are indicated in FIG. 2 using the same reference numerals marked with a prime character, i.e. '.

When applying the first voltage to the first electrode 9, the voltage level is selected from a first plurality of voltage levels. Similarly, when applying the second voltage to the second electrode 9', the voltage level is selected from a second plurality of voltage levels. The control system is arranged such that the second plurality of voltage levels comprises fewer voltage levels than the first plurality of voltage levels.

Embodiments will now be described.

In one embodiment, the first fluid and the third fluid are each arranged to absorb all wavelengths in the visible spectrum. Therefore, when the first fluid and the third fluid are switched to a configuration where they cover the entire first and second surfaces SA, SA', a black display state is provided at the viewing side. Alternatively, a white display state is given when the first and third fluids are configured to be contracted to allow full transmission of light passing through the picture element; this could be for example where the second fluid covers a maximum area of the surface areas SA, SA', i.e. when the first and third fluids have the configuration indicated in FIG. 1 by dashed lines 17, 17', or when the second fluid covers a sufficient area of the surface areas SA, SA' to allow light to pass unhindered through the picture element, with a sufficient extent to provide a white display effect at the viewing side.

Figure 3A:
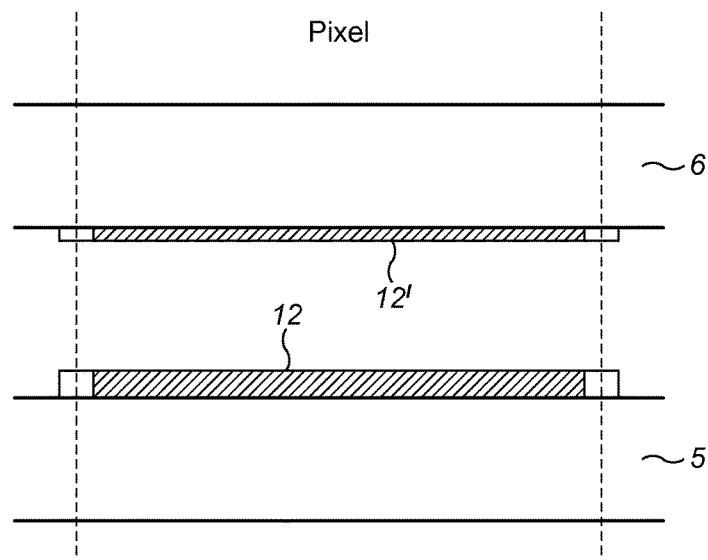
FIGS. 3a, 3b and 3c show schematically display states of the picture element of an embodiment.
Figure 3B:
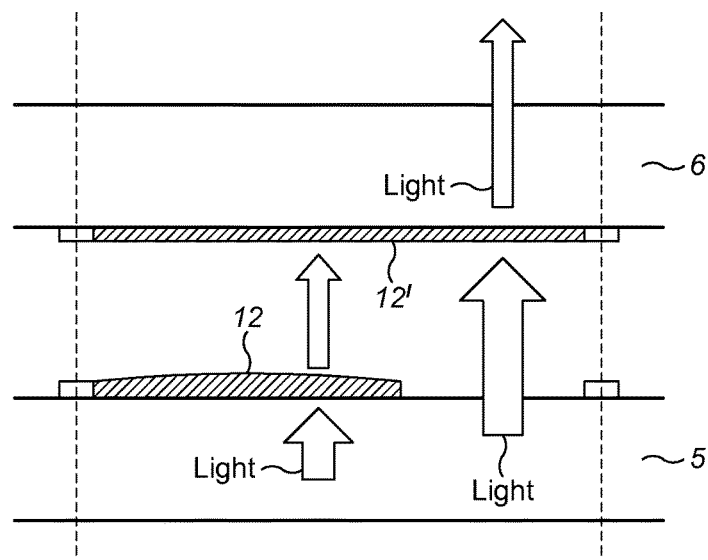
Figure 3C:
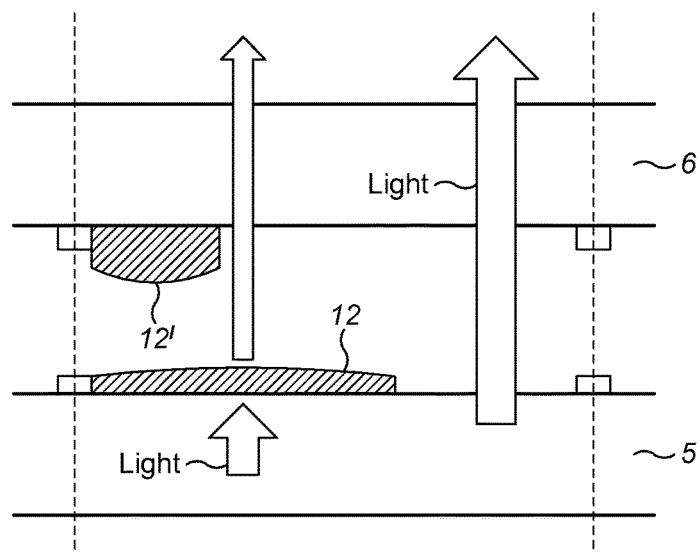

By independently switching the configuration of the first and third fluids, a black, white, or different grey scale display state may be achieved (a grey scale state is an intermediate display state between the black and white states). FIGS. 3a, 3b and 3c illustrate schematically the operation of the picture element illustrated in FIG. 1. FIG. 3a illustrates the black display state with no voltage applied to the first electrode and the second electrode; FIG. 3b illustrates a dark grey scale display state with the first fluid 12 partly contracted to allow part of the light to pass but with the third fluid 12' in a black display state; FIG. 3c illustrates a light grey state where the third fluid is fully contracted to be fully transparent while the first fluid layer is partly contracted to provide an intermediate transmission. It is to be appreciated that numerous grey scale display states may be provided at the viewing side by selecting an appropriate first voltage level and second voltage level to obtain a desired configuration of the first and third fluids. Accordingly, the control system may be arranged to configure the picture element with a predetermined display effect by applying a selected one of the first plurality of first voltage levels to the first electrode and a selected one of the second plurality of second voltage levels to the second electrode.

Depending on the number of display states desired, the control system is configured accordingly. For example, the control system may be arranged such that the first plurality of voltage levels includes 32 different voltage levels and the second plurality of voltage levels comprises 2 different voltage levels. Thus, 64 different combinations of the voltage levels of the first and second pluralities of voltage levels may be applied to the picture element, yielding 64 different display states. These can be for example a white state, a black state, and 62 grey scale states. Alternatively, the control system may be arranged with the first plurality of voltage levels comprising 21 different voltage levels and the second plurality of voltage levels comprising 3 different voltage levels; thus giving 63 display states.

With the second plurality of voltage levels comprising fewer voltage levels than the first plurality of voltage levels, the driver stage for changing the configuration of the first fluid may be different from the driver stage for changing the configuration of the third fluid. In other words, the control system may comprise a first driver type arranged to apply the first voltage to the first electrode and a second driver type arranged to apply the second voltage to the second electrode. In an embodiment, the first driver type is an analogue driver and the second driver type is a pulse width modulated driver. Thus, for the examples above, the control system would be configured for a desired display state to select one of the 2 or 3 voltage levels for driving the pulse width modulated driver, and to select one of the 32 or 21 voltage levels for driving the analogue driver.

The thickness of the first and third fluids, taken along the optical path axis OP indicated in FIG. 1, may be substantially equal to each other, or in other embodiments may be different from each other, depending on the range of display effects desired at the viewing side, and the voltage magnitudes desired to change the configuration of the first and third fluids (since the fluid thickness affects the switching voltage required).

Figure 3D:
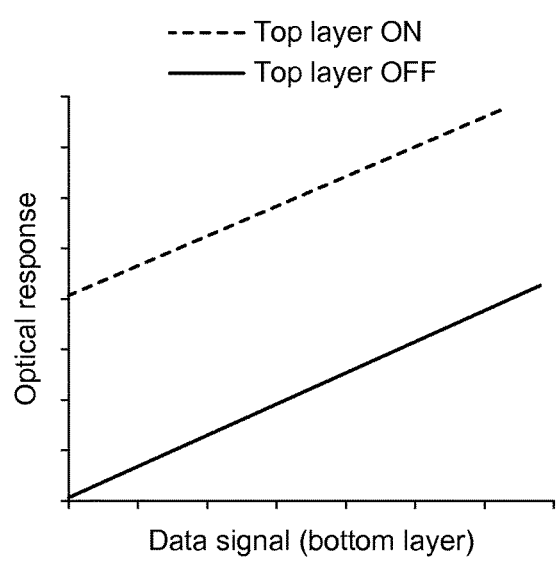
FIGS. 3d, 4a and 4b show schematically plots of grey scales for an embodiment.

FIGS. 3a, 3b and 3c illustrate an example embodiment; the thickness of the third fluid is less than the thickness of the first fluid. Moreover, the driver type for applying the first voltage is an analogue driver, and the driver type for applying the second voltage is a pulse width modulated driver. FIG. 3d shows the distribution of grey scale levels for the picture element of FIGS. 3b and 3c. With the top layer (third fluid) switched off (i.e. display state of FIG. 3b and the bottom, continuous curve in FIG. 3d), the grey level curve illustrates that the picture element (pixel) shows a large variety of grey levels when an analogue voltage is applied to the first fluid. On the other hand, when the top layer (third fluid) is switched on, as illustrated for example in FIG. 3c, the picture element already would show a grey level with no voltage applied to the first fluid, as this first fluid in itself isn't completely absorbing all light. Further, FIG. 3c illustrates an intermediate voltage applied to the first fluid, resulting in a light grey level to be shown by the picture element. In the case of FIG. 3d, the curve with the third fluid (top layer) switched on has the same gradient as the bottom continuous curve of FIG. 3d, as the bottom layer (first fluid) is thicker, as shown by the upper dashed curve in FIG. 3d. Clearly, the starting point of the dashed curve at 0 V should not be higher than the end point of the continuous curve at high voltage, in order to cover the full spectrum of grey levels. Although not illustrated for this embodiment with the first fluid being thicker than the third fluid, the skilled person will understand that when the bottom layer (first fluid) is switched off and the top layer (third fluid) is opened, the corresponding curve of optical response plotted against data signal will have a shallower gradient than the curves illustrated in FIG. 3d.

In an alternative embodiment, the third fluid 12' may have a greater thickness than the first fluid 12. In some embodiments, the sum of both the thickness of the first fluid and the thickness of the third fluid equals a fluid thickness that would be required in a single layer display to provide a black display state, where each of the first and third fluids is arranged to absorb all light wavelengths. The first and third fluids may comprise a dye or a pigment to provide this filtering property.

Figure 4A:
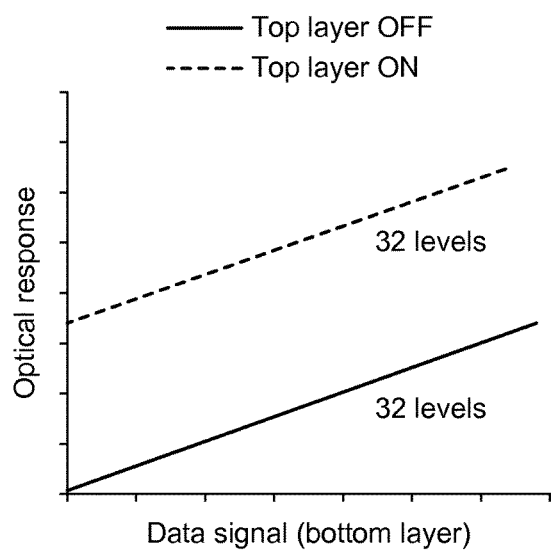
Figure 4B:
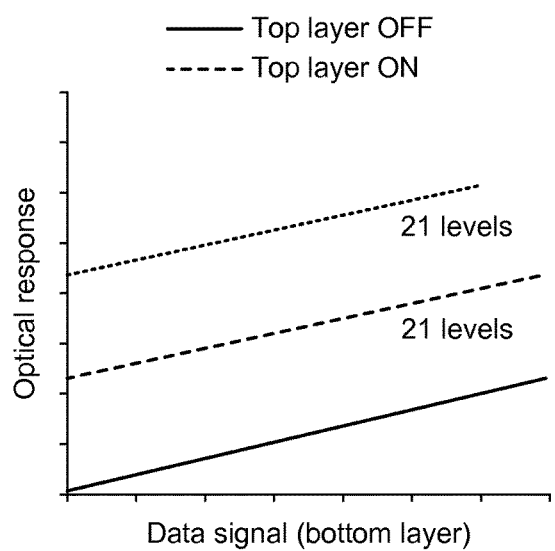

FIGS. 4a and 4b illustrate the fact that the number of grey scales required for the first fluid (bottom layer) is reduced by the presence of the third fluid (top layer), showing two cases. FIG. 4a shows the case for the first and third fluids with the same thickness and a third fluid (top layer) that only has two states, fully off or fully on (i.e. two voltage levels). In this case, the first fluid (bottom layer) needs to be able to show 32 grey levels (=5-bit). Combined with the two states of the third fluid (the top layer), the total number of grey levels that can be produced with this pixel is 32+32=64 states (=6-bit).

FIG. 4b shows the case where the third fluid (top layer) has three possible states (voltage levels): fully off, fully on and a state in between. In this case, the required number of grey levels for the first fluid (the bottom layer) is only 21, as combined with the third fluid (top layer) the pixel can then show 21+21+21=63 levels (i.e. 6 bit grey, with 21 levels for each of the three third fluid states). As would be understood by the person skilled in the art, it may be desirable to choose the ratio of first and third fluid thicknesses for balancing the curves so that the three curves show continuous grey levels.

In some embodiments, the second driver type is integrated in a layer of electronics on the substrate (i.e. the second support plate) supporting the second surface SA, e.g., in an a-Si (amorphous silicon) or LTPS (Low Temperature Polysilicon) layer. This is possible where the driving and electronics required for applying the voltage levels to the third fluid layer are relatively simple, as for the case where the second driver type is a pulse width modulated driver. FIGS. 5a to 5f illustrate this further by comparing an embodiment with a known display device.

Figure 5A:
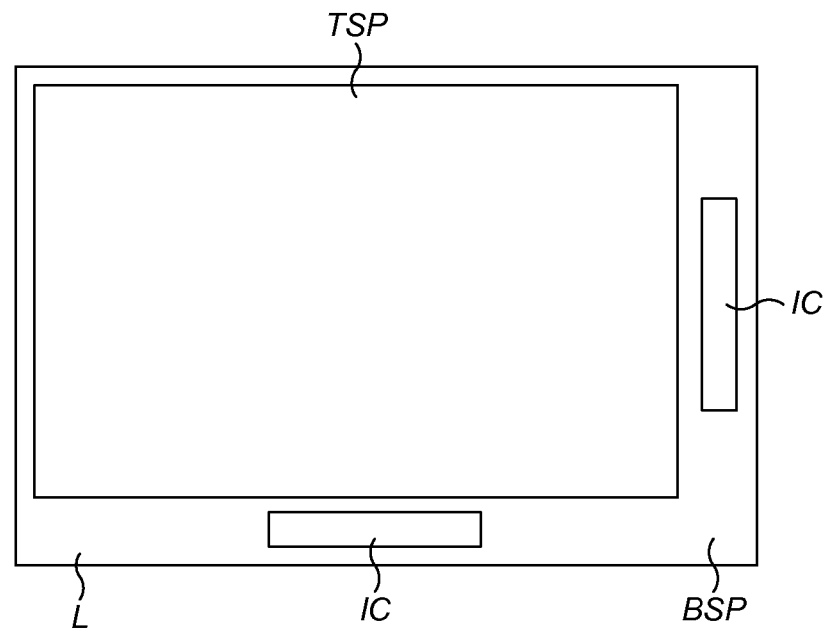
FIGS. 5a, 5b, 5c and 5d show schematically known arrangements of integrated circuits for a picture element.
Figure 5B:
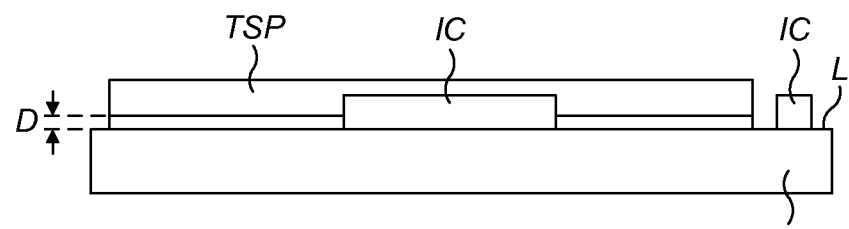

FIGS. 5a and 5b illustrate schematically a single oil layer display device of a known display device, with chip on glass (COG) bonded driver ICs, shown with a top view (FIG. 5a) and a side view (FIG. 5b). In FIG. 5a, the (larger) bottom support plate BSP is shown. On the bottom support plate, a number of driver ICs (in this case one source and one gate driver) and a (smaller) top support plate TSP are positioned. It is clearly visible that the driver ICs take significant space and require an increase of the size of a ledge L. In FIG. 5b, one can see that the driver ICs are typically much higher than the distance D between the bottom and top support plate.

Figure 5C:
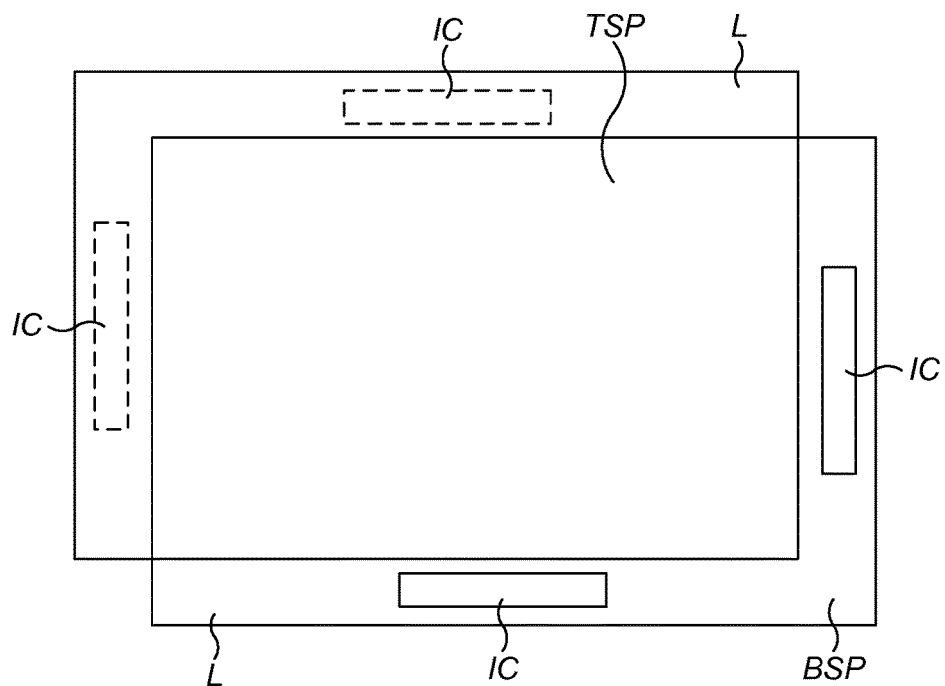
Figure 5D:
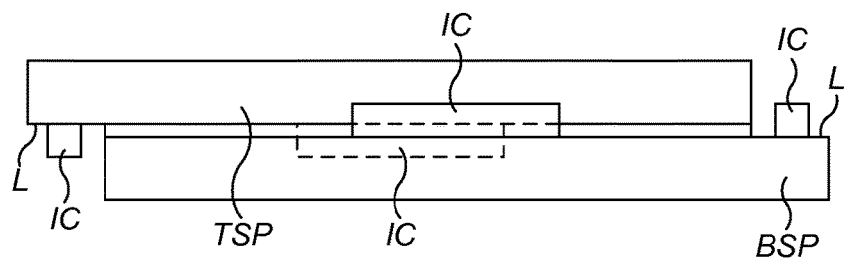

This is a consideration for multi-layer displays (such as the one shown in FIG. 1), as in this case also the top support plate TSP will require ICs in the conventional approach for controlling an oil layer configuration. FIGS. 5c and 5d illustrate, as a top and side view respectively, such an architecture (in this case a two layer display with COG bonded driver ICs) and it is clear that here the ledge L size is much increased, which is undesirable as the form factor of the display (unused vs useful space) is a consideration for keeping the space required for the display in the end application effective.

Figure 5E:
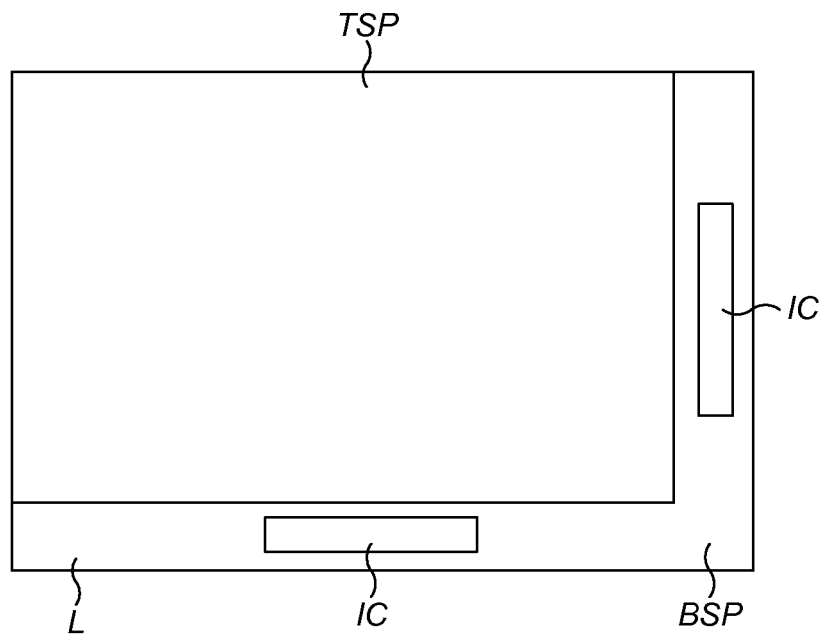
FIGS. 5e and 5f show schematically integrated circuit arrangements according to an embodiment.
Figure 5F:
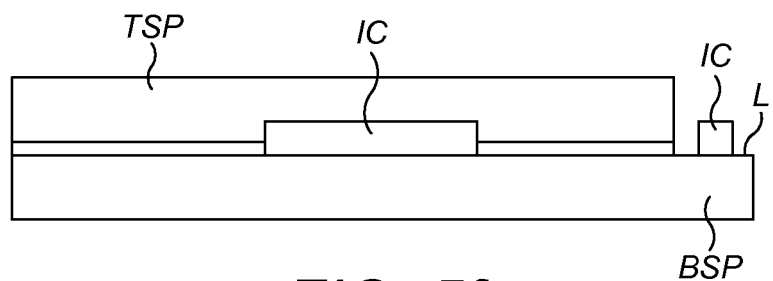

According to an embodiment, the driver may be integrated with the substrate (in this example the second support plate, i.e. the top support plate TSP). This is illustrated by FIGS. 5e and 5f which are a top and side view respectively of a two layer display with COG bonded driver ICs only on the bottom support plate BSP. Such embodiments allow it to be easier to integrate the electronics in the electronics layer on the substrate, of for example a-Si or LTPS on glass, rather than to have to incorporate ICs on the top of the support plate, as the logical function required is simpler, such as simpler driving as for example in the case where a pulse width modulated driver is being used. The integration with the substrate may be done using a-Si or LTPS. The result is shown in FIGS. 5e and 5f, where the ledge L size for the two-layer display is now similar to that of the single layer display, and thus the form factor may be improved.

The connection between the first and the second support plates may be achieved by either having an interconnection foil coming from the first support plate, or with an interconnection directly coming from a printed circuit board (PCB) comprising much of the logic for driving the display, the PCB for example being part of the display controller 104. When using an interconnection foil there may be an area on the second support plate, which does not cover the first support plate, to attach the interconnection foil to. As in FIG. 5c, one end of the foil can be connected to the top or left side (as illustrated), or to both. As for FIGS. 5e and 5f, the second support plate can be interconnected to the first support plate using electrically conductive paste or conductive spacers. There is also a part of the first support plate which provides the appropriate voltages to the interconnection foil. This is known for example in the Liquid Crystal Display industry. As illustrated in FIG. 5e, the substrates are therefore configured such that there is no contact ledge on the top and left sides (as illustrated).

In further alternative embodiments, the first and/or the third fluid may be arranged to absorb light of at least one wavelength, rather than all wavelengths in the visible spectrum. In other words the first and third fluids may act as colour filters. The first fluid may comprise a dye or pigment to give this filtering property. Accordingly, in such embodiments, the picture element may act as a colour picture element. Thus, by switching the first and third fluid configuration in a similar manner as described above for grey scale levels, a cyan (C), magenta (M) and yellow (Y) colour display is provided, with the brightness of each colour being controllable by applying an appropriate voltage level to the first and second electrodes. Such colour picture elements have similarities with the picture elements described above with a black first and third fluid, although as explained below it is necessary in at least some examples to use greater thicknesses of the first and third fluids.

Figure 6A:
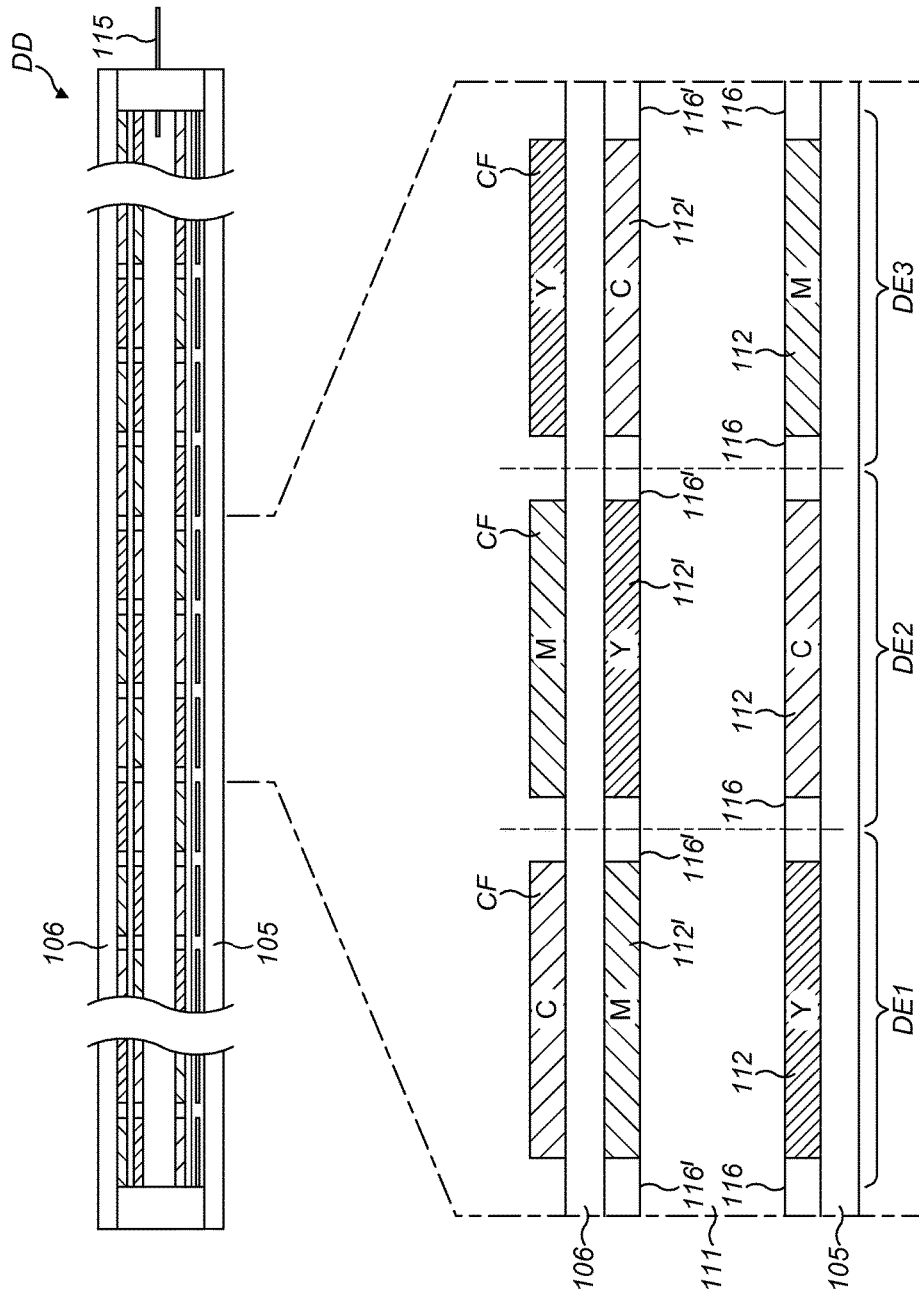
FIGS. 6a, 6b and 6c illustrate schematically picture elements according to an embodiment for providing a colour display.
Figure 6B:
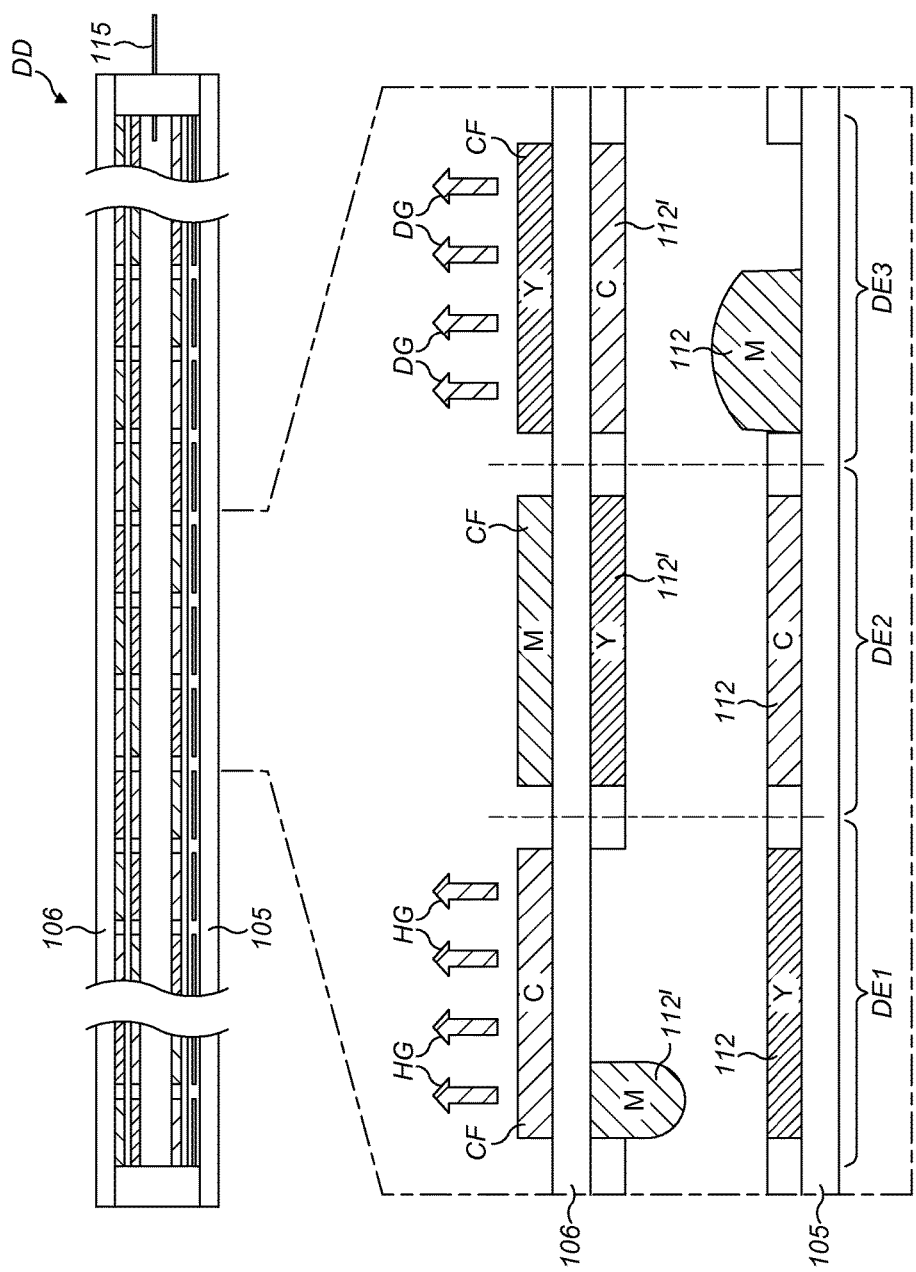
Figure 6C:
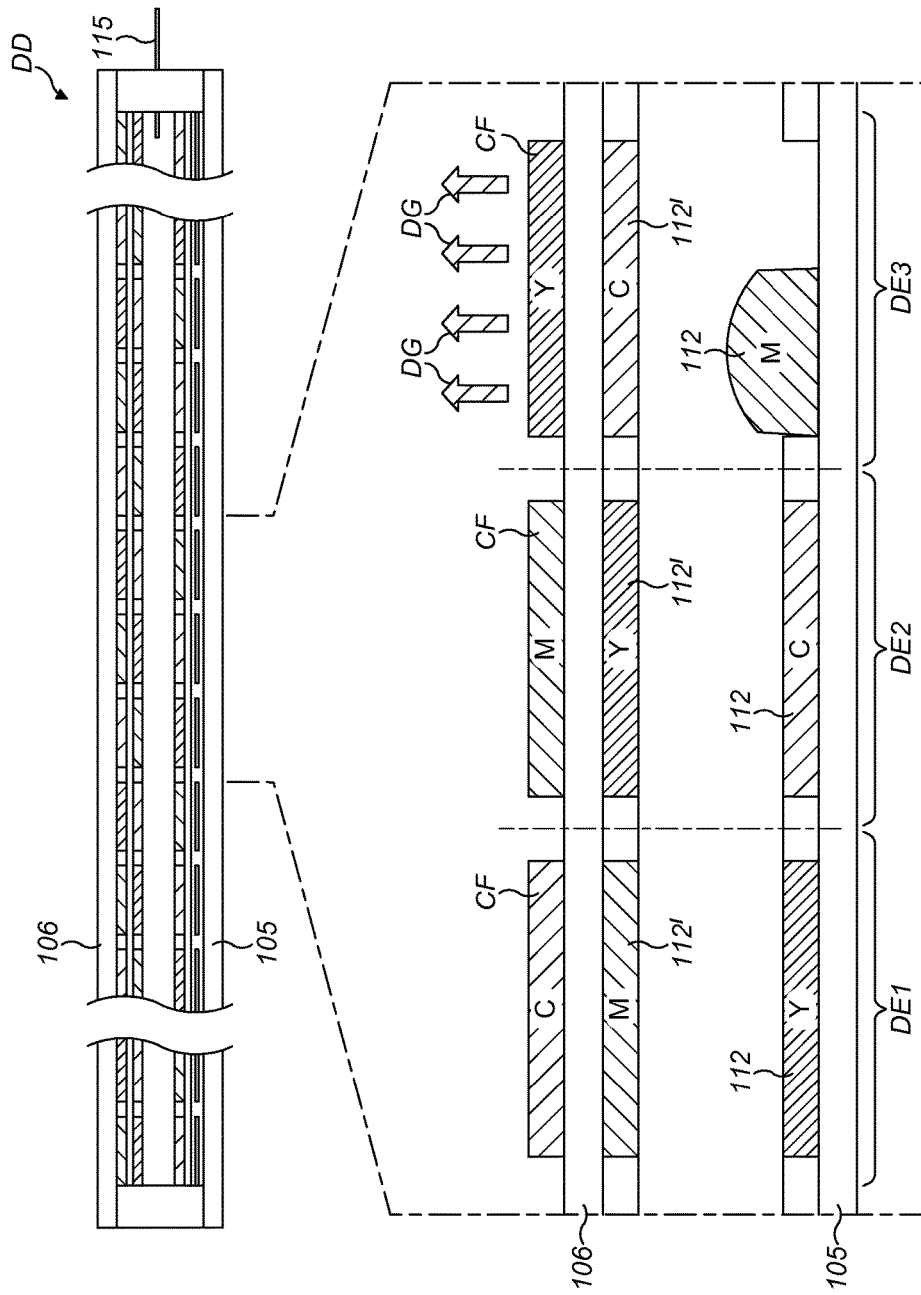

FIGS. 6a, 6b and 6c illustrate schematically an example of a colour display in accordance with embodiments; each of DE1, DE2 and DE3 (where DEx (x=1, 2, 3) is a picture element) illustrated in the Figures corresponds with the picture element described above, except that the first and third fluids 112, 112' are now coloured to act as colour filters. Features of the picture elements described using FIGS. 6a, 6b and 6c correspond with similar features described above and the same reference numerals are used in FIGS. 6a, 6b and 6c, incremented by 100; corresponding descriptions should be taken to apply here also. One picture element DEx represents one sub-pixel of a pixel of a display device DD; a pixel comprises three sub-pixels, namely DE1, DE2 and DE3. In addition to the first and third fluids acting as colour filters, a permanent colour filter (CF) is also provided for each picture element. The colour of the first and third fluids and colour filters is indicated with C, M or Y, corresponding with cyan, magenta or yellow, respectively. The order of the colours alternates between the first fluid, the third fluid and the CF layers. The end result is that each of the sub-pixels in itself has a good black state when all three colour filters of a picture element (i.e. C, M and Y) lie in the light path when no voltage is applied to any of the first and third fluids (FIG. 6a), and the full pixel (i.e. the combination of DE1, DE2 and DE3) can show high brightness colours by using at least two sub-pixels per colour.

In the context of one embodiment, the first fluid (bottom layer) is driven by an analogue driver, while the third fluid (upper layer) has only a small number of grey states, e.g. two voltage levels in the case of a pulse width modulated driver. The full grey scale capability for this colour display becomes a combination of the capability of the individual first and third fluids, so for instance, one can achieve 6-bit resolution with 5-bit grey levels in the bottom layer (first fluid) and two states (voltage levels) in the top layer (third fluid). FIGS. 6b and 6c illustrate this approach by showing the analogue driving of the magenta sub-pixel in the bottom layer (first fluid of DE3), combined with either the on state (see FIG. 6b) or the off state (FIG. 6c) of the magenta pixel on the top layer (third fluid of DE1). In FIG. 6b, which illustrates a relatively high bright green state overall for the pixel, comprising a high green (see arrows labelled HG) colour for DE1, black for DE2 (no arrows are illustrated as no light reaches the viewing side in the black state) and a dark green colour for DE3 (see arrows labelled DG). In FIG. 6c, a darker green state for the pixel is achieved, which is a grey level between 0% and 50% of highest brightness green, since DE1 is now black rather than the high green state of FIG. 6b.

It should be noted that the thickness of the first and third fluids for the colour display embodiment may be equal and may each be of the same thickness as an oil layer thickness of a known single oil layer display. This can achieve a desirable contrast, because each first and third fluid only absorbs a specific part of the visible spectrum; as in the example of FIGS. 6a to c, the magenta fluid layer only absorbs the green part of the spectrum so needs to be sufficiently thick to have enough contrast in the green part of the spectrum.

In further embodiments for providing a colour display, it is envisaged that other colour combinations of fluids and colour filters are possible from those described. Important requirements for the colour combinations that can be used may include that the combination of the colours taken in the direction of the optical path OP should provide a good quality black (i.e. should absorb light of all wavelengths, at least in the visible spectrum, passing through the display in the off, no voltage applied, state) and that the same parts of the spectra can be switched using at least one of the first and third fluids in the sub-pixels to ensure a continuous spectrum of grey levels of colour, i.e. different colour brightnesses.

The above embodiments are to be understood as illustrative examples. Further embodiments are envisaged. For example, in embodiments above an analogue driver and a pulse width modulated driver have been described for a picture element. Other driver types may be used. Indeed, the same type of driver may be used for both the first and third fluids, but the control system may be configured so the first plurality of voltage levels is greater than the second plurality. It should be noted that in the description above, when referring to the Figures, the first fluid has been labelled as the lower of the first and third fluids, and the third fluid has been labelled as the upper of the first and third fluids. It should be appreciated that these upper and lower fluids as illustrated could in further embodiments have been referred to and described as, respectively, the first and third fluids, with the description of other components of the picture element amended accordingly. Further embodiments are therefore envisaged where the first plurality of voltage levels relate to applying a voltage to the upper fluid as illustrated and the second plurality of voltage levels relate to applying a voltage to the lower fluid as illustrated. Accordingly, the second driver type such as a pulse width modulated driver may be used to drive the lower fluid and the first driver type such as an analogue driver may be used to drive the upper fluid. Thus, the second driver type may be integrated with the first support plate. Further, examples of the number of voltage levels in the first plurality and second plurality of voltage levels have been given, for example 32 and 2. In alternative embodiments, the number of voltage levels in the first and second plurality of voltage levels may be selected to be different from those described above, to obtain a desired number of available grey scale states (whether for a monochrome picture element, or a colour picture element) for an application of the picture element. Further, the principle may be applied to picture elements comprising more than two fluids for controlling a colour/grey-scale of light.

The use of a second plurality of voltage levels comprising fewer voltage levels than a first plurality of voltage levels, to change a characteristic of radiation such as the colour of visible light, may be applied to any display device which for example uses two independently switchable display elements. Therefore, in accordance with second embodiments, FIGS. 7a, 7b and 7c show schematically a picture element 20 for changing a characteristic of radiation using the example of in-plane electrophoresis.

Figure 7A:
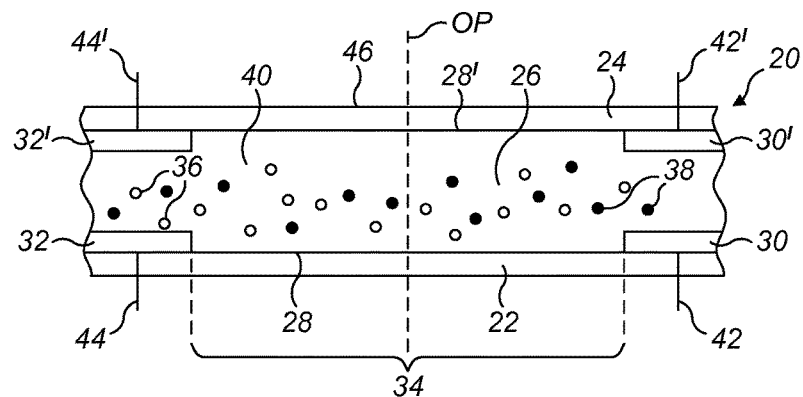
FIGS. 7a, 7b and 7c illustrate schematically a picture element of an electrophoretic display device, according to an embodiment.
Figure 7B:
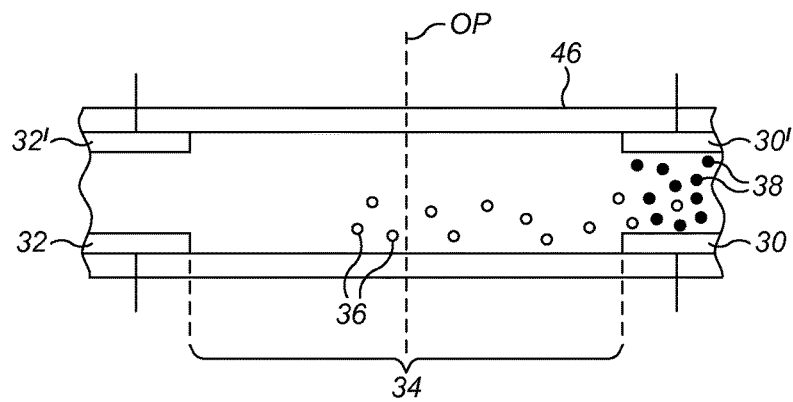
Figure 7C:
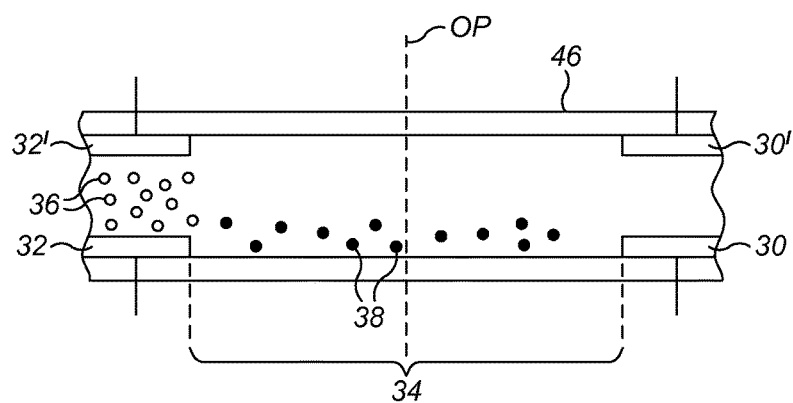

Referring to FIG. 7a, the picture element 20 comprises a first support plate 22 and a second support plate 24 facing the first support plate 22, thus defining a space 26. The first and second support plates are for example glass. A first surface 28 of the first support plate 22 faces the space. A first electrode 30 is associated with part of the first surface, at a side of the picture element. A further electrode 32 is associated with a different part of the first surface, at an opposite side of the picture element from the first electrode. A second electrode 30' is associated with part of the second surface 28'. A further electrode 32' is associated with a different part of the second surface, opposite the second electrode 30'. The term associated here means the electrodes are arranged to apply a voltage over at least one of the first and second surfaces 28, 28'. A feature labelled with a prime, i.e. ', indicates that feature is similar to another feature with the same reference numeral. The first and second electrodes 30, 30' are addressing electrodes and the further electrodes 32, 32' are common electrodes. The electrodes are for example indium tin oxide (ITO). A display area 34 of the picture element is an area of the first surface 28, between the first and further electrodes 30, 32, over which a display effect of the picture element is provided. Radiation, for example light in the visible spectrum, passes through the picture element along an optical path OP. FIG. 7a is illustrated in cross section, in a plane parallel the optical path OP. It is to be understood that the display area 34 is planar, lying in a plane perpendicular the optical path OP, and is square in this embodiment, the further electrode 32 extending along an opposite side to the first electrode 30. In other embodiments, the display area may be differently shaped, for example rectangular, triangular or curved.

The picture element comprises a first display element and a second display element which display elements are each configurable for changing the radiation characteristic. In this embodiment the first display element comprises a first plurality of particles 36 and the second display element comprises a second plurality of particles 38. The particles of the first and second plurality are each selected to provide a predetermined optical property, which may be an absorption, reflection or scattering of at least one predetermined wavelength. In this embodiment the first and second plurality of particles absorb different predetermined wavelengths, and in this example are coloured magenta and cyan, respectively.

The first and second plurality of particles have a predetermined charge; in this embodiment both are negatively charged. The particles may be milled pigment particles with a mixture of stabilisers (e.g. surfactant) and charging agents or dye coloured stabilised polymer pigments. The space 26 is filled with a fluid 40 in which the first and second plurality of particles are suspended. The fluid 40 is for example a liquid such as dodecane or Isopar™ G (Exxon Mobil). The particles of the first plurality are arranged to move faster through the fluid than the particles of the second plurality, when a given voltage is applied. To achieve this, the second plurality may be larger or greater in density than the first plurality.

The configuration of the first and second plurality of particles is independently controllable using a voltage applied to the first, second and/or further electrodes 30, 30', 32, 32'. A control system (not indicated) is connected via signal lines 42, 42', 44, 44' to the first, second and further electrodes and is similar to that described previously for the electrowetting embodiments; the corresponding description should be taken to apply here. The control system controls the voltage level of a first voltage applied to the first electrode 30 and the voltage level of a second voltage applied to the second electrode 30'. The control system selects the voltage level of the first voltage from a first plurality of voltage levels, and the voltage level of the second voltage from a second plurality of voltage levels, the second plurality of voltage levels comprising fewer voltage levels than the first plurality of voltage levels. The voltage levels for the first and second voltage may be set when manufacturing or programming the control system. The examples of the number of available voltage levels given above for an electrowetting picture element, for example 32 (5 bit) and 2 (1 bit), apply also to the electrophoretic examples described herein. The control system is also arranged to control the duration that a voltage level is applied for, i.e. whether a long or a short voltage pulse is applied.

FIGS. 7a, 7b and 7c show examples of configurations of the first and second plurality of particles according to this embodiment, in accordance with a picture element addressing scheme. The addressing scheme may depend on the starting configuration. The picture element comprises a permanent colour filter on the optical path OP, not indicated, which in this example is yellow. Moreover, the picture element may include a backlight (not indicated).

FIG. 7a illustrates a configuration before addressing. Both the magenta and the cyan particles 36, 38 are distributed across the picture element, including the display area 34. Thus, all light passing through the picture element, including the yellow permanent colour filter, is absorbed and the picture element is in a black state.

By addressing the second and further electrodes 30', 32' of the second support plate with a long, positive and high voltage pulse, both pluralities of particles will be collected on the second electrode 30'.

Then, the first and further electrodes 30, 32 of the first support plate are addressed with a shorter and negative voltage pulse. During this pulse, the slower cyan particles 38 will have no time to respond and stay predominantly at the same place. The magenta particles 36 will respond much faster and, as a result, a proportion of these particles will drift to cover at least part of the display area 34. Depending on the voltage level, the number of magenta particles moving to cover the display area can be controlled and thus the absorption level of the green light (which is absorbed by the magenta particles 36) will be controlled in an analogue fashion. FIG. 7b shows an example configuration where the magenta particles partly cover the display area. As the cyan particles are still positioned on the right hand side of the picture element, as illustrated, the red light will be fully transmitted through the picture element, the blue light will be fully absorbed by the yellow colour filter and the green light will be partly transmitted due to only a part of the magenta particles covering the display area of the pixel element.

Then applying a longer negative pulse on the second and further electrodes 30', 32' on the second support plate will move the magenta particles 36 all the way to the left in the picture element, away from the display area, while the much slower cyan particles 38 would be re-distributed over the display area 34. This configuration is illustrated in FIG. 7c.

Following this, a shorter and lower positive voltage pulse on the first and further electrodes 30, 32 on the first support plate would bring a proportion of the magenta particles 36 back to cover at least part of the display area, while the cyan particles 38 do not have the time to respond. The resulting optical state is that the red light is fully absorbed by the cyan particles, the blue light is fully absorbed by the yellow colour filter and the green light is partly absorbed by the magenta particles that only partly cover the display area.

Applying a short but higher positive voltage pulse on the first and further electrodes 30, 32 on the first support plate would return the picture element to the configuration of FIG. 7a.

Further particle configurations are envisaged, which are not illustrated. The extent of the first and/or second plurality of particles covering the display area is controllable by the voltage level applied, i.e. its magnitude and sign, and the duration of application, to the first, second and further electrodes 30, 30', 32, 32', as the skilled person would understand.

In the embodiment of FIGS. 7a, 7b and 7c the first and second plurality of particles mix, and controlling the first voltage applied to the first and further electrodes 30, 32 of the first support plate changes the configuration of the first plurality of particles. Similarly, controlling the second voltage applied to the second and further electrodes 30', 32' changes the configuration of the second plurality of particles. Controlling the second voltage may also change the configuration of the first plurality of particles and/or controlling the first voltage may also change the configuration of the second plurality of particles, with appropriate arrangement of the first and second electrodes. In other embodiments, only the first voltage may be used to control the first or second plurality of particles, and only the second voltage may be used to control the other of the first or second plurality of particles, for example in examples where the two pluralities of particles do not mix.

The driver types described above for electrowetting embodiments may be used in the electrophoretic embodiments, to drive the first and second plurality of particles, and the corresponding description should be taken to apply. For example, the first driver type may drive the first and further electrodes of the first support plate and the second driver type may drive the second and further electrodes of the second support plate. Alternatively, the second driver type may drive the first electrode and the first driver type may drive the second electrode; in this case the second driver type would be integrated with the first support plate.

The picture element of FIGS. 7a to 7c may be part of a matrix of electrophoretic picture elements, sealed around the edge of the matrix, to form a display device. Three picture elements may each be a sub-pixel which together form a pixel of the display device. The three picture elements may be as follows: a first picture element as described in FIGS. 7a to 7c; a second picture element with the first plurality of particles as yellow and the second plurality of particles as magenta, and a cyan permanent colour filter; and a third picture element with the first plurality of particles as cyan and the second plurality of particles as yellow, and a magenta permanent colour filter. In examples where there are two available configurations (i.e. two voltage levels) for the second plurality of particles, and n configurations for the first plurality of particles, the total number of optical states for the pixel of the three sub-pixels, is 2n. Such a pixel corresponds with the electrowetting pixel described using FIGS. 6a to 6c.

Further embodiments of electrophoretic picture elements are envisaged. For example, the shape, size, particle material density, charge, number of particles, concentration of particles in the fluid and/or optical properties, e.g. colour, of the first and/or second plurality of particles may be selected to provide a desired display effect and to modify the switching between different particle configurations.

With differently coloured pluralities of particles, for example cyan, magenta, yellow and in some embodiments white, a full colour subtractive picture element may therefore be provided without requiring stacking of picture elements or sub-pixilation. In further embodiments, an electrowetting display element may be combined in one picture element with an electrophoretic display element. For further details of electrophoretic display devices, such as the in-plane electrophoretic displays above, which may be incorporated in embodiments, please refer to the following, the content of which is incorporated herein by way of reference: US patent publication no. US2010-0060628A1; K. M. H. Lenssen, P. J. Baesjou, F. P. M. Budzelaar, M. H. W. M. van Delden, S. J. Roosendaal, L. W. G. Stofmeel, A. R. M. Verschueren, J. J. van Glabbeek, J. T. M. Osenga, R. M. Schuurbiers, Novel concept for full-color electronic paper, Journal of the SID 17/4, 383 (2009); and A. R. M. Verschueren, L. W. G. Stofmeel, P. J. Baesjou, M. H. W. M. van Delden, K. M. H. Lenssen, M. Mueller, J. J. van Glabbeek, J. T. M. Osenga, R. M. Schuurbiers, Optical performance of in-plane electrophoretic color e-paper, Journal of the SID 18/1, 1 (2010).

In accordance with embodiments, a picture element has been described for an electrowetting picture element and an electrophoretic picture element. In such embodiments a first and second plurality of voltage levels are used to control a first and second display element, respectively, the second plurality comprising fewer voltage levels than the first. It is envisaged to provide this concept in further display technologies which use a first and a second configurable display element to change a light characteristic.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising a picture element, the picture element comprising:
    a support plate comprising:
        a first surface; and
        a non-switchable reflective layer;
    a second surface;
    a first fluid, a second fluid and a third fluid, the first fluid and the third fluid arranged on at least part of the first surface and the second surface, respectively, and the second fluid immiscible with the first fluid and the third fluid, the first fluid, the second fluid and the third fluid located between the first surface and the second surface; and
    a first electrode associated with the first surface and a second electrode associated with the second surface,
    the electrowetting display device comprising a control system operable to, in dependence on input data relating to a grey scale level for display by the picture element, change a configuration of each of the first fluid, the second fluid and the third fluid to a respective configuration corresponding to the grey scale level by application of a first voltage level of a first grey scale voltage to the first electrode and by application of a second voltage level of a second grey scale voltage to the second electrode,
    wherein the control system is arranged such that the first voltage level is selected from a first plurality of voltage levels and the second voltage level is selected from a second plurality of voltage levels, the second plurality of voltage levels comprising fewer voltage levels than the first plurality of voltage levels.

2. The electrowetting display device according to claim 1, wherein with the picture element in an inactive state a thickness of the first fluid substantially equals a thickness of the third fluid.

3. The electrowetting display device according to claim 1, wherein with the picture element in an inactive state a thickness of the first fluid is different from a thickness of the third fluid.

4. The electrowetting display device according to claim 1, wherein the first fluid and the third fluid are each arranged to absorb light of at least one predetermined wavelength.

5. The electrowetting display device according to claim 4, wherein the first fluid and the third fluid are each arranged to absorb substantially all wavelengths in the visible spectrum.

6. The electrowetting display device according to claim 5, wherein with the picture element in an inactive state a sum of a first thickness of the first fluid and a second thickness of the third fluid substantially equals a fluid thickness for the picture element to provide a black display state.

7. The electrowetting display device according to claim 1, wherein the control system comprises a first driver type operable to apply the first grey scale voltage to the first electrode and a second driver type operable to apply the second grey scale voltage to the second electrode.

8. The electrowetting display device according to claim 7, wherein the first plurality of voltage levels comprises 32 different voltage levels and the second plurality of voltage levels comprises 2 different voltage levels.

9. The electrowetting display device according to claim 7, wherein the first plurality of voltage levels comprises 21 different voltage levels and the second plurality of voltage levels comprises 3 different voltage levels.

10. The electrowetting display device according to claim 7, wherein the first driver type is an analogue driver and the second driver type is a pulse width modulated driver.

11. The electrowetting display device according to claim 7, wherein the second driver type is integrated with a substrate supporting the second surface.

12. The electrowetting display device according to claim 1, wherein the control system is operable to configure the picture element to display a predetermined display effect by application of a selected one of the first plurality of voltage levels to the first electrode and a selected one of the second plurality of voltage levels to the second electrode.

13. The electrowetting display device according to claim 1, comprising a third electrode in contact with the second fluid for use in application of the first grey scale voltage between the first electrode and the second fluid, and for use in application of the second grey scale voltage between the second electrode and the second fluid, the second fluid being at least one of: electrically conductive or polar.

14. The electrowetting display device according to claim 1, wherein:
with application of a zero voltage between the first electrode and the second fluid and a non-zero voltage between the second electrode and the second fluid, the first fluid is arranged to absorb a first portion of visible light to provide a first grey scale display effect;
with application of a zero voltage between the second electrode and the second fluid and a non-zero voltage between the first electrode and the second fluid, the third fluid is arranged to absorb a second portion of visible light to provide a second grey scale display effect different from the first grey scale display effect; and
with application of a zero voltage between the first electrode and the second fluid and between the second electrode and the second fluid, the first fluid and the third fluid are together arranged to absorb substantially all wavelengths in the visible spectrum.

15. A display device comprising a picture element operable to change a characteristic of radiation which passes through the picture element, the picture element comprising:
a support plate comprising a non-switchable reflective layer;
a first electrode associated with the support plate;
a second electrode; and
a first display element and a second display element configurable to change the characteristic,
the display device comprising a control system operable to, in dependence on input data relating to a grey scale level for display by the picture element, change the characteristic by application of a first voltage level of a first grey scale voltage to the first electrode and application of a second voltage level of a second grey scale voltage to the second electrode, to determine a respective configuration of the first display element and the second display element to correspond to the grey scale level,
wherein the control system is arranged such that the first voltage level is selected from a first plurality of voltage levels and the second voltage level is selected from a second plurality of voltage levels, the second plurality of voltage levels comprising fewer voltage levels than the first plurality of voltage levels.

16. The display device according to claim 15, wherein the support plate is a first support plate and the picture element comprises a second support plate, the first electrode associated with part of a first surface of the first support plate and the second electrode associated with part of a second surface of the second support plate, the control system operable to:
change the configuration of the first display element by application of the first grey scale voltage to the first electrode, and
change the configuration of the second display element by application of the second grey scale voltage to the second electrode,
to determine a display effect of the picture element.

17. The display device according to claim 16, wherein the control system is operable to at least one of:
change the configuration of the first display element by application of the second grey scale voltage to the second electrode, or
change the configuration of the second display element by application of the first grey scale voltage to the first electrode.

18. The display device according to claim 15, wherein the first display element comprises a first plurality of particles, each particle of the first plurality of particles having a first predetermined optical property and a first predetermined charge, and the second display element comprises a second plurality of particles, each particle of the second plurality of particles having a second predetermined optical property and a second predetermined charge.

19. The display device according to claim 18, wherein the first predetermined optical property and the second predetermined optical property is, respectively, at least one of: absorption of at least one predetermined wavelength, reflection of at least one predetermined wavelength or scattering of at least one predetermined wavelength.

20. The display device according to claim 18, wherein at least one of: the first plurality of particles or the second plurality of particles are suspended in a fluid.

21. The display device according to claim 20, wherein the first plurality of particles and the second plurality of particles are arranged such that the first plurality of particles moves at a different speed through the fluid than the second plurality of particles.

22. The display device according to claim 18, wherein the display device is an electrophoretic display device.

23. The display device according to claim 15, wherein the control system comprises a first driver type operable to apply the first grey scale voltage to the first electrode and a second driver type operable to apply the second grey scale voltage to the second electrode.

24. A control system for controlling a picture element comprising:
- a support plate comprising a non-switchable reflective layer;
- a first electrode associated with the support plate;
- a second electrode; and
- a first display element and a second display element each configurable to change a characteristic of radiation passing through the picture element,
- the control system operable to, in dependence on input data relating to a grey scale level for display by the picture element, change the characteristic by application of a first voltage level of a first grey scale voltage to the first electrode and application of a second voltage level of a second grey scale voltage to the second electrode, to determine a respective configuration of the first display element and the second display element to correspond to the grey scale level,
- wherein the control system is operable to select the first voltage level from a first plurality of voltage levels and to select the second voltage level from a second plurality of voltage levels, the second plurality of voltage levels comprising fewer voltage levels than the first plurality of voltage levels.

25. The control system according to claim 24, the picture element being a picture element of an electrowetting display device, the picture element comprising:
- a first surface associated with the first electrode;
- a second surface associated with the second electrode;
- a first fluid, a second fluid and a third fluid, the first fluid and the third fluid arranged on at least part of the first surface and the second surface, respectively, and the second fluid immiscible with the first fluid and the third fluid, the first fluid, the second fluid and the third fluid located between the first surface and the second surface, the first display element comprising the first fluid and the second display element comprising the third fluid,
- the control system operable to change a configuration of the first fluid, the second fluid and the third fluid by application of the first grey scale voltage to the first electrode and by application of the second grey scale voltage to the second electrode.

26. A method of controlling a picture element, the method comprising:
- determining a first voltage level of a first grey scale voltage, in dependence on input data relating to a grey scale level for display by the picture element, for applying to a first electrode of the picture element, the first electrode associated with a support plate of the picture element, the support plate comprising a non-switchable reflective layer, the determining the first voltage level comprising selecting the first voltage level from a first plurality of voltage levels;
- determining a second voltage level of a second grey scale voltage for applying to a second electrode of the picture element, in dependence on the input data relating to the grey scale level, the determining the second voltage level comprising selecting the second voltage level from a second plurality of voltage levels, the second plurality of voltage levels comprising fewer voltage levels than the first plurality of voltage levels;
- generating the first grey scale voltage with the first voltage level;
- generating the second grey scale voltage with the second voltage level;
- transmitting the first grey scale voltage to the first electrode, for applying the first grey scale voltage to the first electrode to determine a configuration of a first display element of the picture element; and
- transmitting the second grey scale voltage to the second electrode, for applying the second grey scale voltage to the second electrode to determine a configuration of a second display element of the picture element, the configuration of the first display element and the configuration of the second display element corresponding to the grey scale level.

27. The method according to claim 26, wherein the picture element is a picture element of an electrowetting display device;
- the applying the first grey scale voltage to the first electrode determines a configuration of a first fluid, the first display element comprising the first fluid and the picture element comprising a second fluid immiscible with the first fluid; and
- the applying the second grey scale voltage to the second electrode determines a configuration of a third fluid immiscible with the second fluid, the second display element comprising the third fluid.

* * * * *